US006353598B1

(12) United States Patent
Baden et al.

(10) Patent No.: US 6,353,598 B1
(45) Date of Patent: Mar. 5, 2002

(54) ASYMMETRIC MULTIPLE ACCESS PROTOCOL FOR A COMMUNICATION SYSTEM

(75) Inventors: Charlotte Catherine Elizabeth Baden, Malmesbury; Qiang Cao, Swindon; Lorenz Fred Freiberg, Grange Park; David Jonathan Reader, London, all of (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/183,562

(22) Filed: Oct. 30, 1998

(30) Foreign Application Priority Data

Oct. 31, 1997 (EP) .............................. 97308743

(51) Int. Cl.[7] .................. H04Q 7/00; H04B 7/212; H04B 7/216; H04J 3/24; H04M 1/00
(52) U.S. Cl. .................. 370/280; 370/330; 370/337; 370/342; 370/349; 455/448; 455/454; 455/574
(58) Field of Search .................. 370/280, 330, 370/337, 442, 294, 350, 349, 335, 312, 328, 342; 375/202, 203, 206, 356; 455/454, 448, 511, 574

(56) References Cited

U.S. PATENT DOCUMENTS 5,594,720 A * 1/1997 Papadopoulos et al. ..... 370/330
5,619,491 A    4/1997 Panzer ........................ 370/342
5,684,794 A * 11/1997 Lopez et al. ................. 370/337
5,732,073 A *  3/1998 Kusaki et al. ............... 370/280
5,805,633 A *  9/1998 Udenfeltdt ................... 375/202
5,936,947 A *  8/1999 Fujii ........................... 370/280
6,005,854 A * 12/1999 Xu et al. ...................... 370/335
6,035,222 A *  3/2000 Yoshida et al. ............. 455/574

FOREIGN PATENT DOCUMENTS

EP    0 720 405 A2   12/1995   ............ H04Q/7/36
EP    0 766 416 A2    9/1996   ............ H04B/7/26

OTHER PUBLICATIONS

European Search Report dated Apr. 17, 1998.

* cited by examiner

*Primary Examiner*—Wellington Chin
*Assistant Examiner*—M. Phan

(57) ABSTRACT

The invention relates to mobile cellular communication systems in which asymmetric access to a time division duplex (TDD) communication channel is provided. The channel is divided (by TDD) into slots which are allocated to either uplink communication or downlink communication by the base station in each cell. Timing of slots, and thus of compulsory uplink and downlink slots, is coordinated across the cells of a system.

8 Claims, 4 Drawing Sheets

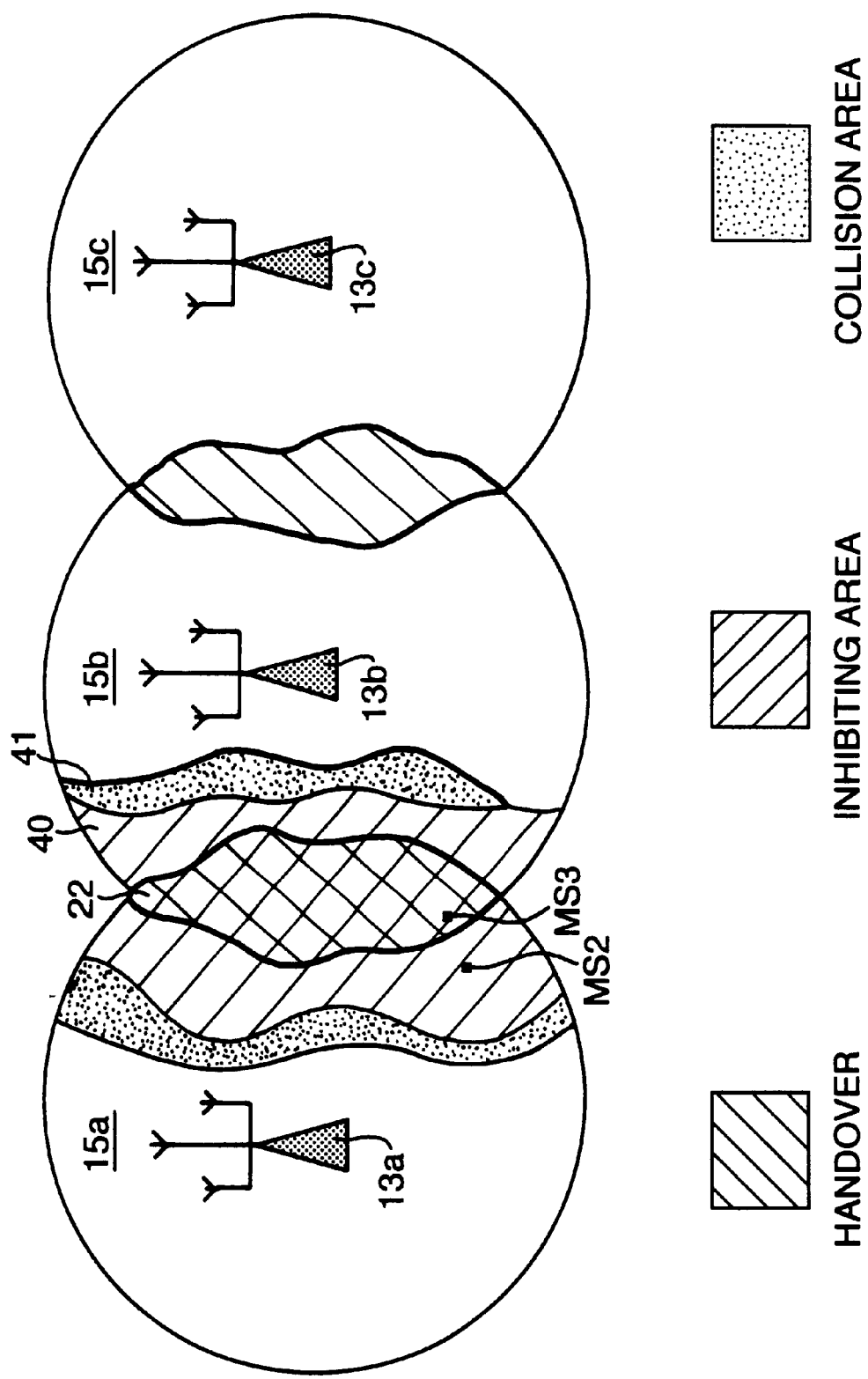

ASYMMETRIC MULTIPLE ACCESS PROTOCOL FOR A COMMUNICATION SYSTEM

CROSS-REFERENCE TO RELATED APPLICATION

This application claims priority of European Patent Application No. 97308743.0, which was filed on Oct. 31, 1997.

BACKGROUND OF THE INVENTION

1. Field of the Invention

This invention relates to a multiple access protocol for a communication system, and in particular to an asymmetric access protocol for a mobile cellular communication system using time division duplexing (TDD).

2. Description of Related Art

In mobile telecommunication systems, data is passed between a mobile end-user device and a base station in an uplink slot, and vice versa in a downlink slot. Similar half duplex communication protocols are used in other communication systems e.g. a ground station to a satellite. In mobile cellular communication systems, an outstanding problem has been that an asymmetry can occur in the ratio of uplink traffic to downlink traffic. For example, using a mobile end user device to send data (e.g. fax or email) can result in several megabytes to be sent on the uplink, whilst only a few bytes are received on the downlink. Current cellular systems have been designed to support asymmetric traffic ratios which are identical across all cells, which leads to an inefficient use of the frequency spectrum. The guard time between slots is an overhead which is always incurred by the system.

EP766416 A describes a wireless multiple access communication systems which dynamically allocates available frame slots to uplink and downlink. A cancellation signal, corresponding to or otherwise representative of the interfering signal, (from an interfering base station to an interfered-with base station) is used. In the interfered-with base station, the cancellation signal is used to cancel or otherwise offset the mixed interference produced in a received composite signal which includes both the desired mobile station to base station (uplink) signal and the interfering signal. Hence it requires interference cancellation technique (timing adjustment, amplitude adjustment, etc), which results in extra hardware implementation complexity. In addition to uplink and downlink, the base station—base station link needs to be maintained, hence the involvement of a Base Station Control (BSC), which is higher level over BS. This causes extra signalling traffic and the mobile terminals are especially vulnerable to extra hardware complexity. EP766416 describes a system used purely for cancelling or reducing co-channel interference purposes by the means of slot allocation (between downlink and uplink) in a frequency reuse cell (essentially non-adjacent cells system.

EP 720 321 A1 describes a similar, TDMA only system. The system is used in either non-cellular systems or cellular system with identical asymmetric pattern, that is where the asymmetric ratio of each cell is the same. The systems uses 'flexible uplink/downlink allocation' achieved by system level flexible uplink/downlink allocation, in which the asymmetric ratio is all the same for all cells.

There is thus a need for a flexible and efficient asymmetric multiple access TDD protocol, which increases the amount of traffic that can be supported over a communication channel without adversely affecting the Quality of Service (QoS) experienced by users of the communication system.

SUMMARY OF THE INVENTION

According to a first aspect of the invention there is provided a method of time division duplexing in a mobile cellular communication system comprising:

dividing the communication system into a plurality of cells, each cell being served by a base station;

providing a channel in the communication system over which a base station and at least one mobile station may communicate;

using time division duplexing to divide the channel into a plurality of frames, each frame consisting of a plurality of slots;

coordinating the time division duplexing across a plurality of cells; and in which each base station allocates slots to either uplink communication or downlink communication to optimise throughput in the channel further comprising that each frame includes a compulsory uplink communication slot and a compulsory downlink communication slot which may be used by a mobile station in an area where drown out would otherwise occur.

According to a second aspect of the invention there is provided apparatus for time division duplexing in a mobile cellular communication system comprising:

at least one mobile station;

a plurality of base stations, each of which serves a cell of the communications system;

a channel in the communication system over which a base station and at least one mobile station may communicate, the channel being divided, using time division duplexing, into a plurality of frames, each frame consisting of a plurality of slots;

a central controller for coordinating the time division duplexing across a plurality of cells; and in which each base station allocates slots to either uplink communication or downlink communication to optimise throughput in the channel further comprising each frame includes a compulsory uplink slot and a compulsory downlink slot in each frame which may be used by a mobile station in an area where drown out would otherwise occur.

The position of the compulsory slots may be determined by a central controller and the position, within the frame, of the compulsory slots will be the same in each cell.

The invention provides an asymmetric TDD system in which resources are allocated on a cell by cell basis, thereby achieving a more flexible and efficient system. All data packets transmitted in a slot can be arranged into consecutive slots; that is uplink slots and downlink slots can be arranged consecutively, thereby obviating the need for guard time between the same type of slot. Since the invention allows an asymmetric traffic ratio (uplink:downlink) for each cell the channel efficiency is improved. Since each base station may allocate uplink and downlink slots according to the type of traffic experienced by a cell, the traffic ratio may be adjusted dynamically.

The slots may be arranged into frames, with the asymmetric traffic ratio being repeated on a frame by frame basis. The base station may broadcast the traffic ratio (i.e. the uplink and downlink allocation) on a general information channel BCCH, so that each mobile station entering a cell is provided with the traffic ratio.

The central coordinating controller may also organise the length of a frame, and govern the timing of frames from cell to cell. Each frame may include a compulsory uplink slot and a compulsory downlink slot, which may for example take the first two slots of each frame. The compulsory slots may be the same for each cell, leading to easy handover between cells, for a mobile station travelling between cells. The frame rate and compulsory slot allocation may be chosen in such a way that a mobile station, restricted to the compulsory slots only, will not suffer from a reduced QoS, particularly if running a delay sensitive application.

BRIEF DESCRIPTION OF THE DRAWINGS

A more detailed description of a practical mobile cellular communication system is described below, by way of example, and with reference to the following figures, in which:

FIG. 4 illustrates the inhibiting area, the collision area and the non-inhibiting area for three adjacent cells.

DETAILED DESCRIPTION

Figure 1:
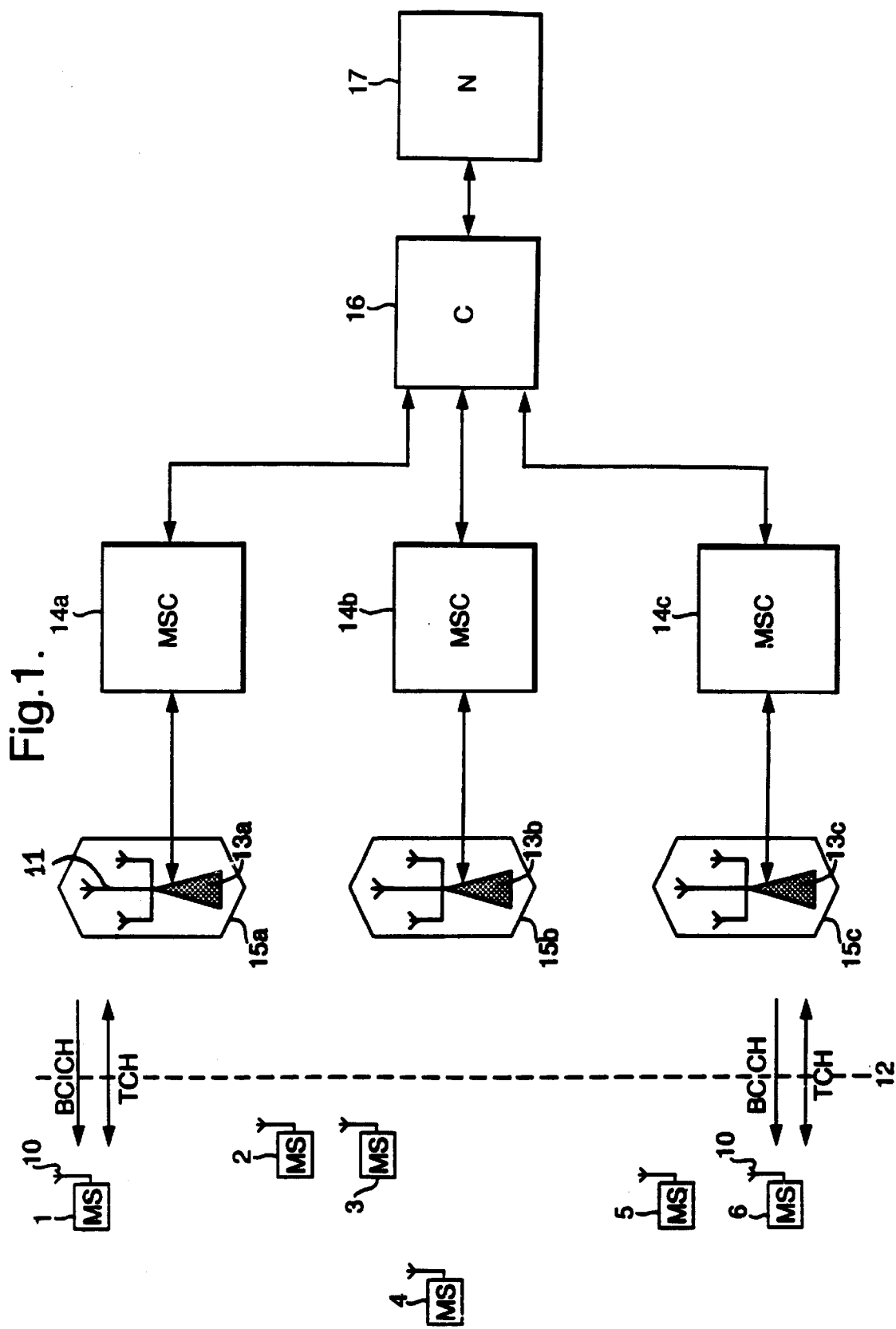
FIG. 1 shows a block diagram of a mobile cellular communication system.

An end-user device (Mobile Station 1,2,3,4,5,6, etc) may use any one of a number of communication protocols to communicate with its nearest base station 13, via antennae 10 and 11 across an air interface 12. In the following embodiment, the communication protocol used is CDMA (code division multiple access). This enables the mobile stations to communicate using a coded spread spectrum signal with codes which are almost uncorrelated, thereby providing a multiple access communications protocol in which the collisions are not destructive of other signals broadcast concurrently. Once a communication channel has been established between mobile station and its closest base station 13, the mobile switching centre 14a may establish a further connection to another mobile switching centre 14b or to the public voice or data networks 17 via the central coordinating controller 16.

The base station continually broadcasts information on its broadcast control channel (BCCH) to all mobile stations within range. The BCCH information includes various codes and control signals necessary for a mobile station to register into the system and the traffic ratio (uplink:downlink). Each mobile station uses the relative strength of the BCCH from neighbouring base stations to determine whether handover to another base station is appropriate. A base station may page a mobile station on the paging channel (PCH) or, alternatively, a mobile station may request access to the system on the random access channel (RACH). The base station and the mobile communication over the traffic channel (TCH), whilst the base station transmits feedback control over the associated control channel (ACCH). Data transmitted over the TCH is divided into packets, which are transmitted in a particular slot with appropriate control bits.

Figure 2:
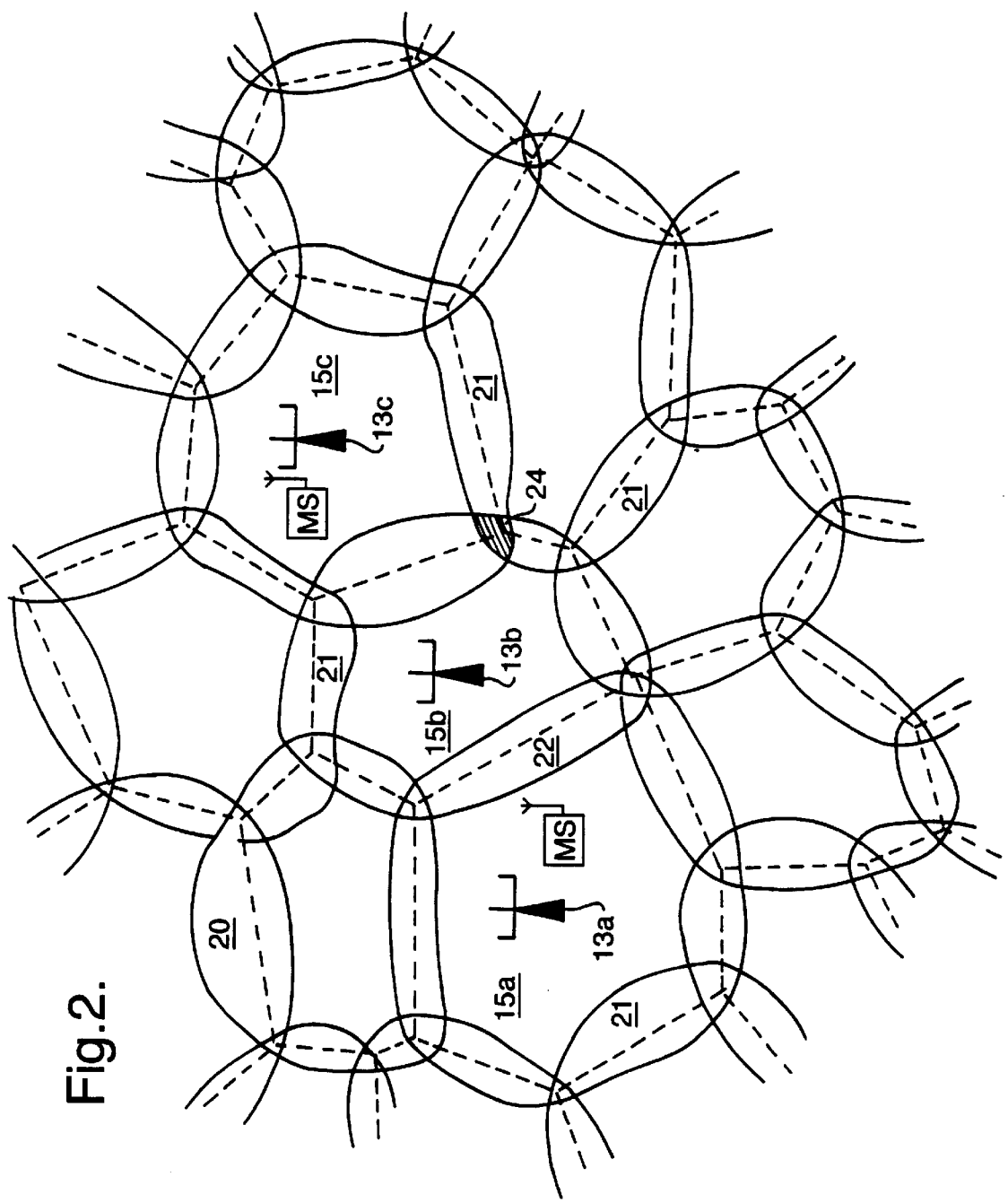
FIG. 2 shows an area of the communication system divided into overlapping cells.

FIG. 2 shows a communication system with overlapping cell coverage (15a, 15b, 15c) supplied by a number of base stations (13a, 13b, 13c). Although the cell coverage is more often represented as a honeycomb structure, the actual coverage depends on the environmental features, and a large overlap (e.g. 20) can occur. The general overlap (21) is the handover area in which the signals from adjacent base stations are received by a mobile station with equal strength. A mobile station may request handover from one base station (13a) to another (13b) in this area (22).

Figure 3:
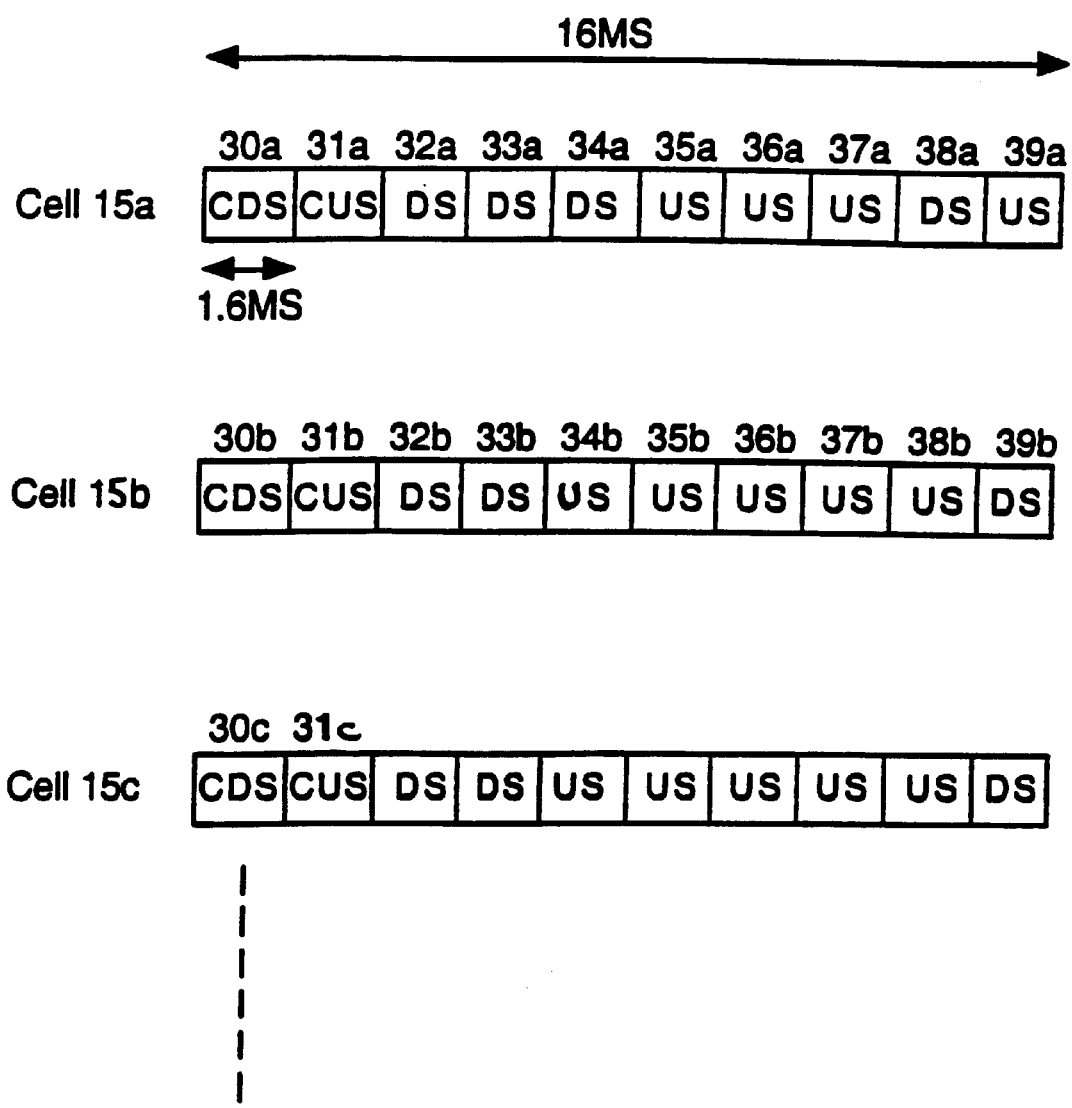
FIG. 3 illustrates frame traffic for adjacent cells within the communication system.

FIG. 3 illustrates the uplink and downlink traffic in a frame for three adjacent cells 15a, 15b, 15c. Each frame includes a compulsory downlink slot (CDS) which the central controller 16 has allocated to the first slot of each frame (30a, 30b, 30c). The frames also include a compulsory uplink slot (CUS) which the central controller 16 allocates to the second slot of each frame (31a, 31b, 31c).

As may be seen from FIG. 3, cells 15b and 15c are using the same traffic ratio, which in this case is 4:6 (downlink:uplink) distributed as 1 down:1 up:2 down:5 up:1 down. Cell 15a is using a different traffic ratio of 5:5, distributed as 1 down:1 up:3 down:3 up:1 down:1 up.

It may occur that near a handover area "drown out" will corrupt the signals of adjacent mobile stations which are registered to two adjacent base stations. That is, where mobile station 2 and mobile station 3 are physically close together and mobile station 2 is registered with base station 13a, whilst mobile station 3 is registered with base station 13b. Mobile station 3, which is active on an uplink slot in slot 34b may drown-out the signal from base station 13a, which is trying to communicate on a downlink to mobile station 2. Mobile stations 2 and 3 may also collide in slots 37 and 38. In order to overcome this, mobile stations entering an inhibiting area (40) are required to use only the compulsory uplink and the compulsory downlink slots (CUS, CDS). The size of the inhibiting area will depend on a number of factors, such as signal power control and the signal processing ability of both the base stations and the mobile stations. Also shown on FIG. 4 is the collision area 41, which is the area of cell coverage where collision actually occur, requiring the data packet transmitted in corrupted slot to be retransmitted.

The inhibiting area is determined by each mobile stations' ability to recognize that it is an area where collisions are likely. A reasonable estimate of the collision area can be determined using existing cellular communications technology, such as the GSM (Group Special Mobile or Global System for Mobile Communications) system. Using a similar algorithm to that used for handover, the inhibiting area will consist of the area of overlap between two cells. As in the handover procedure, mobile stations will be continually searching for the beacon signal (BCCH signal) broadcast constantly by all base stations. The beacon signal will contain information concerning the traffic ratio currently being employed by the base station. If the adjacent base station beacon signal indicates a different traffic ratio to that currently employed by the mobile station and when the power level of the beacon signal reaches a predetermined threshold, the mobile will consider itself within an inhibiting area. Mobile stations may not recognize the full extent of the collision area since collisions depend upon the presence of two interfering mobile stations.

In an ideal system, the collision area and the inhibiting area will overlap exactly. Each mobile system may be provided with geographical location mechanism, enabling the mobile station to accurately determine its position relative to each base station. Such a mechanism would utilise, for example, base station triangulation. Alternatively, each mobile could be fitted with a satellite positioning system such as a GPS locator. The traffic ratio of each cell is known by the central controller. This information, along with the accurate positioning information determined for each mobile station would enable the central controller to determine whether a particular mobile station needs to be fully or partially inhibited. It may not be necessary to restrict mobile stations to the compulsory slots since, as shown in FIG. 3, slots 32, 33, 35, 36 and 37 have been given the same allocation by base stations 13a and 13b (cells 15a and 15b). Thus mobile stations 2 and 3 could be partially inhibited, that is prevented from using slots 34, 38 and 39 when in the inhibiting area 40. Mobile stations may be required to use only the compulsory slots at, for example, the intersection of three cells, such as shown by point 24 of FIG. 2.

Returning to FIG. 3, the frame length is shown as 16 ms, and the slot length is 1.6 ms. If a voice transmission is used as an example, coded by a voice coder at a rate of 32000 bits/second, or 512 bits/frame. Assuming 64 information bits are added, for header and other information, this gives a speech data packet of 576 bits. Thus the data rate must be at least 360,000 bits per second, if the mobile station is limited to sending all the speech data in the compulsory uplink.

The foregoing is illustrative of the invention and other embodiments, falling within the scope of the invention would be immediately apparent to one skilled in the art.

What is claimed is:

1. A method of time division duplexing in a mobile cellular communication system comprising:

dividing the communication system into a plurality of cells, each cell being served by a base station;

providing a channel in the communication system over which a base station and at least one mobile station may communicate;

using time division duplexing to divide the channel into a plurality of frames, each frame consisting of a plurality of slots;

coordinating the time division duplexing across a plurality of cells; and in which each base station allocates slots to either uplink communication or downlink communication to optimise throughput in the channel comprising that each frame includes a compulsory uplink communication slot and a compulsory downlink communication slot, inhibiting a mobile station from using selected slots of frames dependent upon the mobile station being determined as in an area where drown-out would otherwise occur, the selected slots not including the compulsory uplink communication slot and compulsory downlink communication slot.

2. A method as claimed in claim 1 wherein the position of the compulsory slots is determined by a central controller.

3. A method as claimed in claim 1 wherein the inhibiting of the mobile station is selectably inhibiting the mobile station from using all but the compulsory uplink communication slot and compulsory downlink communication slot of the frames.

4. A method as claimed in claim 3 wherein the position of the compulsory slots is the same in each cell.

5. Apparatus for time division duplexing in a mobile cellular communication system comprising:

at least one mobile station;

a plurality of base stations, each of which serves a cell of the communications system;

a channel in the communication system over which a base station and at least one mobile station may communicate, the channel being divided, using time division duplexing, into a plurality of frames, each frame consisting of a plurality of slots; a central controller for coordinating the time division duplexing across a plurality of cells; and in which each base station allocates slots to either uplink communication or downlink communication to optimise throughput in the channel further comprising each frame includes a compulsory uplink slot and a compulsory downlink slot, a mobile station being inhibited from using selected slots of frames dependent upon the mobile station being determined as in an area where drown-out would otherwise occur, the selected slots not including the compulsory uplink communication slot and compulsory downlink communication slot.

6. Apparatus as in claim 5 wherein the mobile station is selectably inhibited from using all but the compulsory uplink communication slot and compulsory downlink communication slot of the frames.

7. Apparatus as claimed in claim 5 wherein the central controller determines the position of the compulsory slots.

8. Apparatus as claimed in claim 6 wherein the central controller places the compulsory slots in the same position in each frame and in each cell.

* * * * *